United States Patent
Okamoto et al.

(10) Patent No.: US 6,941,057 B1
(45) Date of Patent: Sep. 6, 2005

(54) LIGHT GUIDE PLATES AND PROCESS FOR PRODUCING THE SAME

(75) Inventors: Masaya Okamoto, Ichihara (JP); Shigeki Kuze, Ichihara (JP)

(73) Assignee: Idemitsu Kosan Co., Ltd., Tokyo (JP)

(*) Notice: Subject to any disclaimer, the term of this patent is extended or adjusted under 35 U.S.C. 154(b) by 157 days.

(21) Appl. No.: 10/110,135

(22) PCT Filed: Nov. 21, 2000

(86) PCT No.: PCT/JP00/08211

§ 371 (c)(1),
(2), (4) Date: Apr. 9, 2002

(87) PCT Pub. No.: WO01/55755

PCT Pub. Date: Aug. 2, 2001

(30) Foreign Application Priority Data

| Jan. 27, 2000 | (JP) | 2000-018620 |
| Jan. 27, 2000 | (JP) | 2000-018621 |
| Jan. 31, 2000 | (JP) | 2000-021407 |

(51) Int. Cl.$^7$ ............................. G02B 6/00; G02B 6/10
(52) U.S. Cl. ................................. 385/143; 385/146
(58) Field of Search ................. 385/129–132, 385/141–145, 901

(56) References Cited

U.S. PATENT DOCUMENTS

| 4,775,732 A | * | 10/1988 | Lapin ........................ 528/49 |
| 4,902,735 A | | 2/1990 | Okamoto et al. |
| 6,342,349 B1 | * | 1/2002 | Virtanen ..................... 435/6 |
| 6,654,532 B1 | * | 11/2003 | Ishii et al. .................. 385/129 |

FOREIGN PATENT DOCUMENTS

| EP | 335214 | 10/1989 |
| EP | 736574 | 10/1996 |
| EP | 794209 | 9/1997 |
| JP | 2-113455 | 4/1990 |
| JP | 5-89827 | 4/1993 |
| JP | 6-43638 | 2/1996 |
| JP | 9-131770 | 5/1997 |
| JP | 11-323324 | 11/1999 |
| WO | 91/09896 | 7/1991 |

* cited by examiner

Primary Examiner—John D. Lee
Assistant Examiner—Sarah U Song
(74) Attorney, Agent, or Firm—Oblon, Spivak, McClelland, Maier & Neustadt, P.C.

(57) ABSTRACT

Disclosed are an optical waveguide that comprises (A) a copolyester carbonate having aliphatic segment(s), and a method for producing it; and an optical waveguide made from a polycarbonate resin composition that comprises (A) a copolyester carbonate having aliphatic segment(s) and (B) an aromatic polycarbonate, and a method for producing it. The polycarbonate resin composition for the optical waveguide has the advantages of high mechanical strength and improved flowability.

22 Claims, No Drawings

LIGHT GUIDE PLATES AND PROCESS FOR PRODUCING THE SAME

TECHNICAL FIELD

The present invention relates to a light guide plate (an optical waveguide) and to a method for producing it. More precisely, the invention relates to an optical waveguide for backlight units, for example, for automobile meter panels and tail lamps, in particular to that having a microprism structure that serves as a light-scattering layer, and relates to a method for producing such an optical waveguide.

BACKGROUND ART

Ordinary backlight units for liquid-crystal image displays and those for various guide lights generally have a built-in surface light source that emits light uniformly. The surface light source is made of a transparent tabular molding. This receives the light from a main light source, cathode ray tube (fluorescent lamp) combined with it, and emits light from its surface, and this is referred to as an optical waveguide. Specifically, the light from the main light source enters the optical waveguide through its side surface, and a part of it runs inside the optical waveguide and scatters on the light-scattering layer disposed on the back surface of the optical waveguide to give scattered light, and, as a result, the entire surface of the optical waveguide emits light uniformly.

For forming the light-scattering layer, heretofore, a dot pattern is printed on the back surface of a plate to be an optical waveguide, or the back surface thereof is machined with a conical drill. However, such methods require a high-level technique. Therefore, the recent tendency in the art is toward a method of transferring a microprism structure onto a plate to be an optical waveguide.

The material of such an optical waveguide must satisfy the requirement of high-level complete light transmittance, for which, therefore, generally used is acrylic resin (PMMA) However, acrylic resin does not have good heat resistance, high mechanical strength and good flame retardancy, and is therefore unsuitable for lighting units of, for example, displays, tail lamps and winkers for automobiles. As opposed to this, polycarbonate resin is being used for that purpose, as having good heat resistance, high mechanical strength and good flame retardancy. However, ordinary polycarbonate resin is poorly flowable, and is therefore problematic in that the transferability of a microprism structure onto a plate of the resin is not good. For improving the transferability of such polycarbonate resin, known is a method of lowering the molecular weight of the resin. However, the reduction in the molecular weight of the resin detracts from the mechanical strength thereof. Accordingly, for the material of an optical waveguide, desired is polycarbonate resin having good flowability and high mechanical strength. The present invention has been made in consideration of the situation mentioned above, and is to provide an optical waveguide made from a polycarbonate resin composition having improved flowability, and to provide a method for producing it.

DISCLOSURE OF THE INVENTION

We, the present inventors have assiduously studied, and, as a result, have found that a polycarbonate resin composition comprising a copolyester carbonate having aliphatic segment(s) and an aromatic polycarbonate meets the object of the invention mentioned above. On the basis of this finding, we have completed the present invention.

Specifically, the invention is summarized as follows:

1. An optical waveguide which comprises (A) a copolyester carbonate having aliphatic segment(s).

2. An optical waveguide made from a polycarbonate resin composition that comprises (A) a copolyester carbonate having aliphatic segment (s), and at least one resin selected from (B) an aromatic polycarbonate and (C) an acrylic resin, in which the amount of (B) is at most up to 90 parts by weight relative to 100 parts by weight of (A), and the amount of (C) falls between 0.01 and 1.0 part by weight relative to 100 parts by weight of (A).

3. The optical waveguide of above 1 or 2, wherein the aliphatic segment in the component (A) is derived from a polymethylene-dicarboxylic acid, and the ratio of the polymethylene-dicarboxylic acid falls between 1 and 30 mol % of the main monomer (diphenol) that constitutes the polycarbonate resin composition.

4. An optical waveguide which comprises an aromatic polycarbonate resin terminated with a substituted phenoxy group of a general formula:

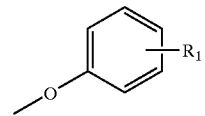

in which $R^1$ represents an alkyl group having from 10 to 30 carbon atoms, or a branched alkyl group having from 10 to 30 carbon atoms, or a formula:

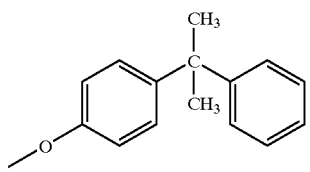

or a formula

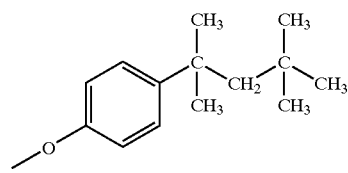

5. The optical waveguide of above 4, which contains from 0.01 to 1.0 part by weight of an acrylic resin relative to 100 parts by weight of the aromatic polycarbonate resin therein.

6. The optical waveguide of any of above 1 to 5, which is made of a tabular molding and has, on its face or back, a microprism structure that serves as a light-scattering layer.

7. The optical waveguide of above 6, wherein the microprism structure is a regular tetrahedral structure.

8. The optical waveguide of above 7, wherein the regular tetrahedral structure has a height falling between 10 and 300 μm.

9. A method for producing the optical waveguide of any of above 6 to 8, in which, when a tabular molding for it is injection-molded, a microprism structure that serves as a light-scattering layer is transferred onto its face or back with a stamper.

BEST MODES OF CARRYING OUT THE INVENTION

The invention is described in detail hereinunder.

For the optical waveguide of the invention, used is a polycarbonate resin composition that comprises (A) a copolyester carbonate having aliphatic segment(s) and (B) an aromatic polycarbonate.

The copolyester carbonate having aliphatic segment(s) for the component (A) of the invention (this is hereinafter referred to as BPA-PMDC copolymer) comprises, for example, an aromatic polycarbonate moiety and a polyester moiety derived from a diphenol and a polymethylene-dicarboxylic acid. Preferably, it is a copolymer having, in the molecule, an aromatic polycarbonate moiety that comprises structural units of the following structural formula (1), and a polyester moiety that comprises structural units of the following structural formula (2):

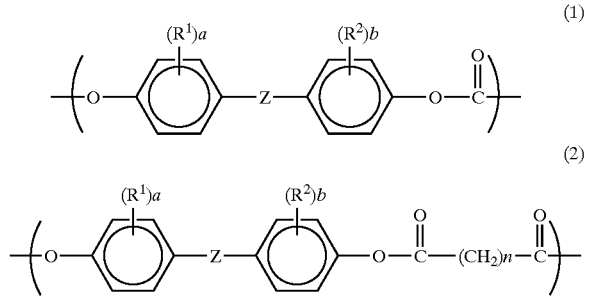

wherein $R^1$ and $R^2$ each represent an alkyl group having from 1 to 6 carbon atoms, or a phenyl group, and they may be the same or different;

Z represents a single bond, an alkylene group having from 1 to 20 carbon atoms, an alkylidene group having from 1 to 20 carbon atoms, a cycloalkylene group having from 5 to 20 carbon atoms, a cycloalkylidene group having from 5 to 20 carbon atoms, or a bond of —SO$_2$—, —SO—, —S—, —O— or —CO—, and it is preferably an isopropylidene group;

a and b each indicate an integer falling between 0 and 4, and are preferably 0; and n indicates an integer falling between 8 and 20.

The BPA-PMDC copolymer is produced, for example, through interfacial polycondensation of a polycarbonate oligomer (hereinafter referred to as PC oligomer) having been previously prepared to constitute the aromatic polycarbonate moiety of the copolymer with a polymethylene-dicarboxylic acid in such a manner that the two are dissolved in a solvent such as methylene chloride, chlorobenzene or chloroform, then an aqueous caustic alkali solution of a diphenol is added thereto, and they are interfacially polycondensed in the presence of a tertiary amine (e.g., triethylamine) or a quaternary ammonium salt (e.g., trimethylbenzylammonium chloride) serving as a catalyst and in the presence of a terminator.

The terminator may be any and every one generally used in polycarbonate production. Concretely, for example, it includes phenol, p-cresol, p-tert-butylphenol, and tert-octylphenol. Preferred for it is a monophenol such as p-tert-octylphenol, p-cumylphenol, p-nonylphenol, p-tert-amylphenol. Also usable for the terminator are phenols of the following general formula:

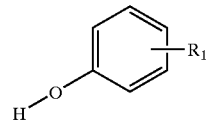

wherein $R^1$ represents an alkyl group having from 10 to 30 carbon atoms, preferably an alkyl group having from 10 to 20 carbon atoms. If the number of carbon atoms constituting $R^1$ in this is smaller than 10, it is undesirable since the flowability of the aromatic polycarbonate resin produced in the presence of the terminator of the type will be low; but if larger than 30, it is also undesirable since the heat resistance thereof will gradually lower. The alkyl group in this may be linear or branched. Of the phenols, especially preferred are p-alkylphenols. The copolymer may be incompletely terminated with the terminator, still having a hydroxyl residue of the diphenol that remains at its ends, and its terminal fraction may be at least 60%.

The PC oligomer may be readily prepared, for example, by reacting a diphenol of the following general formula (3):

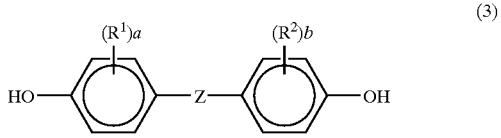

in which $R^1$, $R^2$, Z, a and b have the same meanings as above, with a carbonate precursor such as phosgene or a carbonate compound, in a solvent such as methylene chloride. Concretely, for example, the diphenol is reacted with a carbonate precursor such as phosgene in a solvent such as methylene chloride, or it is transesterified with a carbonate precursor such as diphenyl carbonate.

For the diphenol of formula (3), especially preferred is 2,2-bis(4-hydroxyphenyl)propane (generally referred to as bisphenol A). Except bisphenol A, the diphenol includes, for example, bis(hydroxyaryl)alkanes such as bis(4-hydroxyphenyl)methane, 1,1-bis(4-hydroxyphenyl)ethane, 2,2-bis(4-hydroxyphenyl)butane, 2,2-bis(4-hydroxyphenyl)octane, 2,2-bis(4-hydroxy-1-methylphenyl)propane, 1,1-bis(4-hydroxy-tert-butylphenyl)propane, 2,2-bis(4-hydroxy-3-bromophenyl)propane, 2,2-bis(4-hydroxy-3,5-tetramethylphenyl)propane, 2,2-bis(4-hydroxy-3-chlorophenyl)propane, 2,2-bis(4-hydroxy-3,5-tetrachlorophenyl)propane, 2,2-bis(4-hydroxy-3,5-tetrabromophenyl)propane; bis(hydroxyaryl) arylalkanes such as 2,2-bis(4-hydroxyphenyl)phenylmethane, bis(4-hydroxyphenyl)naphthylmethane; bis(hydroxyaryl)cycloalkanes such as 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane; dihydroxyaryl ethers such as 4,4'-dihydroxyphenyl ether, 4,4'-dihydroxy-3,3'-dimethylphenyl ether; dihydroxydiaryl sulfides such as 4,4'-dihydroxydiphenyl sulfide, 4,4'-dihydroxy-3,3'-dimethyldiphenyl sulfide; dihydroxydiaryl sulfoxides such as 4,4'-dihydroxydiphenyl sulfoxide, 4,4'-dihydroxy-3, 3'-dimethyldiphenyl sulfoxide; dihydroxydiaryl sulfones such as 4,4'-dihydroxydiphenyl sulfone, 4,4'-dihydroxy-3,3'-dimethyldiphenyl sulfone; and dihydroxydiphenyls such as 4,4'-dihydroxydiphenyl. One or more of these diphenols may be used herein either singly or as combined.

The carbonate compound includes, for example, diaryl carbonates such as diphenyl carbonate; and dialkyl carbonates such as dimethyl carbonate, diethyl carbonate.

The PC oligomer to be used in producing the PC-PMDC copolymer for use in the invention may be a homopolymer of one type of the diphenol mentioned above, or a copolymer of two or more different types thereof. In addition, it may also be a thermoplastic random branched polycarbonate obtained from a polyfunctional aromatic compound and the diphenol. For it, the branching agent (polyfunctional aromatic compound) includes, for example, 1,1,1-tris(4-hydroxyphenyl)ethane, $\alpha$, $\alpha'$, $\alpha''$-tris( 4-hydroxyphenyl)-1,3,5-triisopropylbenzene, 1-[$\alpha$-methyl-$\alpha$-(4'-hydroxyphenyl)ethyl]-4-[$\alpha'$, $\alpha$-4-[$\alpha'$, $\alpha'$-bis(4''-hydroxyphenyl)ethyl] benzene, phloroglucine, trimellitic acid, isatin-bis(o-cresol).

Preferably, the number of methylene units in the polymethylene-dicarboxylic acid falls between 8 and 20. Concretely, the acid includes, for example, octane-dicarboxylic acid, decane-dicarboxylic acid, and dodecanedicarboxylic acid, of which decane-dicarboxylic acid is more preferred.

The component (A) can be produced in the manner mentioned above, but its production generally gives an aromatic polycarbonate as the side product. Preferably, the viscosity-average molecular weight of the component (A) falls between 10,000 and 40,000, more preferably between 12,000 and 30,000.

On the other hand, the viscosity-average molecular weight of the component (B), aromatic polycarbonate preferably falls between 10,000 and 40,000, more preferably between 12,000 and 30,000. The aromatic polycarbonate is not specifically defined, and it can be readily produced through reaction of a diphenol with phosgene or a carbonate compound.

Concretely, for example, in a solvent such as methylene chloride in the presence of a terminator such as triethylamine, a diphenol is reacted with a carbonate precursor such as phosgene, or it is transesterified with a carbonate precursor such as diphenyl carbonate.

The diphenol may be the same as those of formula (3) mentioned above, or may be different from them. The polycarbonate may be a homopolymer of one type of the diphenol, or a copolymer of two or more different types thereof. In addition, it may also be a thermoplastic random branched polycarbonate obtained from a polyfunctional aromatic compound and the diphenol.

Examples of the carbonate compound are diaryl carbonates such as diphenyl carbonate, and dialkyl carbonates such as dimethyl carbonate, diethyl carbonate.

Like in the above, the terminator may be any and every one generally used in ordinary polycarbonate production.

The viscosity-average molecular weight of the polycarbonate resin composition comprising the components (A) and (B) for the optical waveguide of the invention preferably falls between 10,000 and 40,000, more preferably between 12,000 and 25,000, even more preferably between 14,000 and 19,000. If its molecular weight is too small, the mechanical strength of the resin composition of the invention will be often low; but if too large, the flowability thereof will be often poor. Preferably, the amount of the polymethylene-dicarboxylic acid to be used herein falls between 1 and 30 mol %, more preferably between 2 and 20 mol %, even more preferably between 5 and 10 mol % of the main monomer (diphenol) that constitutes the polycarbonate resin composition comprising the components (A) and (B). If the amount of the polymethylene-dicarboxylic acid is too small, the flowability of the polycarbonate resin composition could not be improved; but if too large, the heat resistance thereof will be low.

For improving its photoconductivity, the polycarbonate resin composition of the invention preferably contains from 0.01 to 1.0 part by weight, relative to 100 parts by weight of the composition, of an acrylic resin (C). If the acrylic resin content of the composition is smaller than 0.01 parts by weight, the photoconductivity of the composition could not be well improved; but if larger than 1.0 part by weight, the photoconductivity of the composition will be rather lowered. More preferably, the acrylic resin content of the composition falls between 0.05 and 0.5 parts by weight.

The acrylic resin (C) is a polymer having a repetitive monomer units of any of acrylic acid, acrylates, acrylonitrile, and their derivatives. It may be a homopolymer or a copolymer with any of styrene, butadiene and the like. Concretely, it includes, for example, polyacrylic acid, polymethyl methacrylate (PMMA), polyacrylonitrile, ethyl acrylate-2-chloroethyl acrylate copolymer, n-butyl acrylate-acrylonitrile copolymer, acrylonitrile-styrene copolymer, acrylonitrile-butadiene copolymer, and acrylonitrile-butadiene-styrene copolymer. Of those, especially preferred is polymethyl methacrylate (PMMA).

For preventing it from being thermally degraded to yellow in molding, the polycarbonate resin composition of the invention preferably contains a stabilizer. The stabilizer may be a reactive silicone compound (e.g., organosiloxane) derived from a silicone compound by introducing a functional group such as methoxy or vinyl group thereinto. In general, the amount of the stabilizer to be in the polycarbonate resin composition may fall between 0.01 and 3.0 parts by weight, but preferably between 0.05 and 2.0 parts by weight, relative to 100 parts by weight of the composition.

Not interfering with the object of the invention, the polycarbonate resin composition may further contain any other various additives. For example, it may contain any of antioxidants such as hindered phenols, esters, phosphates and amines; UV absorbents such as benzotriazoles and benzophenones; optical stabilizers such as hindered amines; internal lubricants such as aliphatic carboxylates, paraffins, silicone oils and polyethylene waxes; and any other ordinary flame retardants, flame retardation promoters, mold release agents, and antistatic agents.

Formulating and kneading the constituents components to prepare the composition may be effected in any ordinary manner. For example, the components may be mixed by the use of a ribbon blender, a drum tumbler, a Henschel mixer, a Banbury mixer, a single-screw extruder, a double-screw extruder, a cokneader, or a multi-screw extruder. The temperature in the kneading operation may fall generally between 280 and 320° C.

The optical waveguide of the invention is made of a tabular molding of the polycarbonate resin composition mentioned above, having a light-scattering layer formed on its face or back. For forming the light-scattering layer, employable is a method of printing a dot patter on the face or the back of the tabular resin molding, or a method of machining the tabular resin molding with a conical drill.

Apart from these, however, preferred is a method of transferring a microprism structure onto the face or the back of the tabular resin molding.

The microprism structure is not specifically defined, but is preferably a regular tetrahedral structure. Also preferably, its height falls between 10 and 300 μm, more preferably between 20 and 200 μm, even more preferably between 50 and 100 μm.

The optical waveguide of the invention may be produced, for example, as follows: When a tabular molding for it is injection-molded, a microprism structure that serves as a light-scattering layer is transferred onto its face or back with a stamper. In this method, the light-scattering layer may be formed entirely or partially on the face or the back of the tabular resin molding. Preferably, the resin composition is injection-molded at a cylinder temperature falling between 260 and 330° C. and at a mold temperature falling between 50 and 120° C.

The thickness of the optical waveguide is not specifically defined, for which the tabular molding may have a thickness of about 3 mm. The form of the optical waveguide is not also specifically defined, or that is, it is not all the time limited to a tabular form. For example, the optical waveguide may be in the form of a curved plate having a lens effect. Anyhow, the form of the optical waveguide may be suitably determined, depending on the object and the use thereof. Still another example of the optical waveguide may be so designed that its thickness is gradually reduced in the direction remoter from the light source for it, or that is, it has a tapered cross section. If desired, the optical waveguide may be designed that it is integrated with a separate display member disposed in front of its surface emitter.

The invention is described more concretely with reference to the following Production Examples, Working Examples and Comparative Examples, which, however, are not intended to restrict the scope of the invention.

PRODUCTION EXAMPLE 1

[Production of Polycarbonate Oligomer]

60 kg of bisphenol A was dissolved in 400 liters of aqueous 5 wt. % sodium hydroxide solution to prepare an aqueous solution of bisphenol A in sodium hydroxide. Next, while kept at room temperature, the bisphenol A solution was fed into a tubular reactor (inner diameter: 10 mm, length: 10 m) via an orifice plate at a flow rate of 138 liters/hr, with methylene chloride thereinto at a flow rate of 69 liters/hr. Along with these, phosgene was also introduced thereinto at a flow rate of 10.7 kg/hr. In that condition, these were continuously reacted for 3 hours. The tubular reactor used herein has a double-wall structure, and cooling water was circulated through the jacket area so that the temperature of the reaction liquid at its outlet could be 25° C. The reaction liquid to be taken out of the reactor was controlled to have a pH of from 10 to 11. The thus-obtained reaction liquid was statically kept as such, and the aqueous phase was separated and removed. The methylene chloride phase (220 liters) was collected, containing a PC oligomer (concentration; 317 g/liter). The degree of polymerization of the polycarbonate oligomer thus obtained herein falls 2 and 4, and the normality of its chloroformate concentration is 0.7.

PRODUCTION EXAMPLE 2

[Production of BPA-PMDC Copolymer A]

10 liters of the polycarbonate oligomer obtained in Production Example 1 was put into a 50-liter reactor equipped with a stirrer, to which were added an aqueous solution of decane-dicarboxylic acid in sodium hydroxide (decane-dicarboxylic acid 485 g, sodium hydroxide 168 g, water 3 liters) and 5.8 ml of triethylamine. These were stirred at 300 rpm at room temperature for 1 hour, and reacted. Next, the reaction system was mixed with an aqueous solution of bisphenol A in sodium hydroxide (bisphenol A 534 g, sodium hydroxide 312 g, water 5 liters) and 136 g of p-cumylphenyl, to which was added 8 liters of methylene chloride. These were stirred at 500 rpm for 1 hour and reacted. After the reaction, 7 liters of methylene chloride and 5 liters of water were added to this, and further stirred at 500 rpm for 10 minutes. After stirring it was stopped, this was statically kept as such, and the organic phase was separated from the aqueous phase. The resulting organic phase was washed with alkali, 5 liters of aqueous 0.03 N sodium hydroxide solution, then with acid, 5 liters of 0.2 N hydrochloric acid, and then twice with 5 liters of water in that order. Finally, methylene chloride was removed from it, and a flaky polymer was thus obtained. The terminal fraction of the p-cumylphenoxy group of the polymer was 99.5%; the viscosity-average molecular weight of the polymer was 17,000; and the decane-dicarboxylic acid content of the polymer was 8.1 mol % of all the constituent monomers.

PRODUCTION EXAMPLE 3

[Production of Aromatic Polycarbonate B]

10 liters of the polycarbonate oligomer obtained in Production Example 1 was put into a 50-liter reactor equipped with a stirrer, and 95.9 g of p-tert-butylphenol was dissolved therein. Next, an aqueous sodium hydroxide solution (sodium hydroxide 53 g, water 1 liter) and 5.8 ml of triethylamine were added thereto, stirred at 300 rpm for 1 hour, and reacted. Next, the reaction system was mixed with an aqueous solution of bisphenol A in sodium hydroxide (bisphenol A 720 g, sodium hydroxide 412 g, water 5.5 liters), to which was added 8 liters of methylene chloride. These were stirred at 500 rpm for 1 hour and reacted. After the reaction, 7 liters of methylene chloride and 5 liters of water were added to this, and further stirred at 500 rpm for 10 minutes. After stirring it was stopped, this was statically kept as such, and the organic phase was separated from the aqueous phase. The resulting organic phase was washed with 5 liters of an alkali (0.03 N NaOH), 5 liters of an acid (0.2 N HCl), and 5 liters of water (two times) in that order. Next, methylene chloride was evaporated away, and a flaky polymer was thus obtained. The terminal fraction of the p-tert-butylphenoxy group of the polymer was 99.5%; and the viscosity-average molecular weight of the polymer was 17,000.

The viscosity-average molecular weight (Mv) of the BPA-PMDC copolymer and the aromatic polycarbonate resin was obtained as follows: The viscosity of the polymer in methylene chloride at 20° C. was measured with an Ubbelohde's viscometer, from which was derived the intrinsic viscosity [η] thereof. The viscosity-average molecular weight of the polymer is calculated according to the following formula:

$$[\eta]=1.23\times10^{-5}\,Mv^{0.83}$$

EXAMPLES 1 TO 4, AND COMPARATIVE EXAMPLES 1 TO 3

The polymer prepared in each Production Example was mixed with PMMA (Sumitomo Chemical's Sumipec MG5), a stabilizer (Shin-etu Silicone's KR219, organosiloxane having methoxy and vinyl groups), and an antioxidant (Asahi Denka Industry's PEP36, phosphorus-containing antioxidant) in the ratio indicated in Table 1. The resulting mixture was molded in a mold cavity of 60×60×3 mm, with a regular tetrahedral microprism (height 70 µm) stamper inserted in the cavity. The cylinder temperature was 320° C., and the mold temperature was 115° C. The degree of microprism transfer on the thus-obtained optical waveguide, and the falling weight impact strength and the luminosity of the optical waveguide are given in Table 2. The methods of measuring the data are described hereinunder.

PRODUCTION EXAMPLE 4

[Production of Terminal-Modified Polycarbonate A1]

10 liters of the polycarbonate oligomer obtained in Production Example 1 was put into a 50-liter reactor equipped with a stirrer, and 167 g of p-dodecylphenyl (from Yuka Skenectady) was dissolved therein. Next, an aqueous sodium hydroxide solution (sodium hydroxide 53 g, water 1 liter) and 5.8 cc of triethylamine were added thereto, stirred at 300 rpm for 1 hour, and reacted. Next, the reaction system was mixed with an aqueous solution of bisphenol A in sodium hydroxide (bisphenol A 720 g, sodium hydroxide 412 g, water 5.5 liters), to which was added 8 liters of methylene chloride. These were stirred at 500 rpm for 1 hour and reacted. After the reaction, 7 liters of methylene chloride and 5 liters of water were added to this, and further stirred at 500 rpm for 10 minutes. After stirring it was stopped, this was statically kept as such, and the organic phase was separated from the aqueous phase. The resulting organic phase was washed with 5 liters of an alkali (0.03 N NaOH), 5 liters of an acid (0.2 N HCl), and 5 liters of water (two times) in that order. Next, methylene chloride was evaporated away, and a flaky polymer was thus obtained. The polymer was dried at 120° C. for 48 hours. The terminal fraction of the p-dodecylphenoxy group of the polymer was 99.5%; and the viscosity-average molecular weight of the polymer was 17,000.

PRODUCTION EXAMPLE 5

[Production of Terminal-modified Polycarbonate A2]

A flaky polymer was produced in the same manner as in Production Example 4, for which, however, used was 95.5 g of p-tert-butylphenyl in place of 167 g of p-dodecylphenyl. The terminal fraction of the p-tert-butylphenoxy group of the polymer was 99.5%; and the viscosity-average molecular weight of the polymer was 17,000.

The viscosity-average molecular weight (Mv) of the polycarbonate resin was obtained as follows: Its viscosity in methylene chloride at 20° C. was measured with an Ubbelohde's viscometer, from which was derived the intrinsic viscosity $[\eta]$ of the resin. The viscosity-average molecular weight of the resin is calculated according to the following formula:

$$[\eta]=1.23\times10^{-5}Mv^{0.83}$$

EXAMPLES 5 TO 7, AND COMPARATIVE EXAMPLES 4 TO 6

The flaky polymer prepared in any of Production Examples 4 and 5 was mixed with PMMA (Sumitomo Chemical's Sumipec MG5), a stabilizer (Shin-etu Silicone's KR219, organosiloxane having methoxy and vinyl groups), and an antioxidant (Asahi Denka Industry's PEP36, phosphorus-containing antioxidant) in the ratio indicated in Table 1. The resulting mixture was molded in a mold cavity of 60×60×3 mm, with a regular tetrahedral microprism (height 70 µm) stamper inserted in the cavity. The cylinder temperature was 320° C., and the mold temperature was 115° C. The degree of microprism transfer on the thus-obtained optical waveguide, and the falling weight impact strength and the luminosity of the optical waveguide are given in Table 2. The methods of measuring the data are described hereinunder.

PRODUCTION EXAMPLE 6

[Production of Terminal-Modified Polycarbonate A3]

10 liters of the polycarbonate oligomer obtained in Production Example 1 was put into a 50-liter reactor equipped with a stirrer, and 155 g of p-tert-octylphenol was dissolved therein. Next, an aqueous sodium hydroxide solution (sodium hydroxide 53 g, water 1 liter) and 5.8 cc of triethylamine were added thereto, stirred at 300 rpm for 1 hour, and reacted. Next, the reaction system was mixed with an aqueous solution of bisphenol A in sodium hydroxide (bisphenol A 720 g, sodium hydroxide 412 g, water 5.5 liters), to which was added 8 liters of methylene chloride. These were stirred at 500 rpm for 1 hour and reacted. After the reaction, 7 liters of methylene chloride and 5 liters of water were added to this, and further stirred at 500 rpm for 10 minutes. After stirring it was stopped, this was statically kept as such, and the organic phase was separated from the aqueous phase. The resulting organic phase was washed with 5 liters of an alkali (0.03 N NaOH), 5 liters of an acid (0.2 N HCl), and 5 liters of water (two times) in that order. Next, methylene chloride was evaporated away, and a flaky polymer was thus obtained. The polymer was dried at 120° C. for 48 hours. The terminal fraction of the p-tert-octylphenoxy group of the polymer was 99.5%; and the viscosity-average molecular weight of the polymer was 14,900.

PRODUCTION EXAMPLE 7

[Production of Terminal-Modified Polycarbonate A4]

A flaky polymer was produced in the same manner as in Production Example 6, for which, however, used was 113 g of p-tert-butylphenol in place of 155 g of p-tert-octylphenol. The terminal fraction of the p-tert-butylphenoxy group of the polymer was 99.5%; and the viscosity-average molecular weight of the polymer was 15,000.

PRODUCTION EXAMPLE 8

[Production of Terminal-Modified Polycarbonate A5]

A flaky polymer was produced in the same manner as in Production Example 6, for which, however, used was 71 g of phenyl in place of 155 g of p-tert-octylphenyl. The terminal fraction of the phenoxy group of the polymer was 99.5%; and the viscosity-average molecular weight of the polymer was 15,100.

PRODUCTION EXAMPLE 9

[Production of Terminal-modified Polycarbonate A6]

A flaky polymer was produced in the same manner as in Production Example 6, for which, however, used was 95.9 g of p-tert-butylphenol in place of 155 g of p-tert-octylphenol. The terminal fraction of the p-tert-butylphenoxy group of the polymer was 99.5%; and the viscosity-average molecular weight of the polymer was 17,000.

The viscosity-average molecular weight (Mv) of the polycarbonate resin was obtained as follows: Its viscosity in methylene chloride at 20° C. was measured with an Ubbelohde's viscometer, from which was derived the intrinsic viscosity [η] of the resin. The viscosity-average molecular weight of the resin is calculated according to the following formula:

$$[\eta] = 1.23 \times 10^{-5} M_v^{0.83}$$

PRODUCTION EXAMPLE 10

[Production of Terminal-Modified Polycarbonate A7]

10 liters of the polycarbonate oligomer obtained in Production Example 1 was put into a 50-liter reactor equipped with a stirrer, and 155 g of p-tert-octylphenol was dissolved therein. Next, an aqueous sodium hydroxide solution (sodium hydroxide 53 g, water 1 liter) and 5.8 ml of triethylamine were added thereto, stirred at 300 rpm for 1 hour, and reacted. Next, the reaction system was mixed with an aqueous solution of bisphenol A in sodium hydroxide (bisphenol A 720 g, sodium hydroxide 412 g, water 5.5 liters), to which was added 8 liters of methylene chloride. These were stirred at 500 rpm for 1 hour and reacted. After the reaction, 7 liters of methylene chloride and 5 liters of water were added to this, and further stirred at 500 rpm for 10 minutes. After stirring it was stopped, this was statically kept as such, and the organic phase was separated from the aqueous phase. The resulting organic phase was washed with 5 liters of an alkali (0.03 N NaOH), 5 liters of an acid (0.2 N HCl), and 5 liters of water (two times) in that order. Next, methylene chloride was evaporated away, and a flaky polymer was thus obtained. The polymer was dried at 120° C. for 48 hours, and then pelletized through extrusion at 260° C. The viscosity-average molecular weight of the polymer was 15,000.

PRODUCTION EXAMPLE 11

[Production of Terminal-Modified Polycarbonate A8]

A flaky polymer was produced in the same manner as in Production Example 10, for which, however, used was 71 g of phenol in place of 155 g of p-tert-octylphenol. The viscosity-average molecular weight of the polymer was 15,100. Examples 8 to 10, and Comparative Examples 7 to 10:

The flaky polymer prepared in any of Production Examples 6 to 11 was mixed with PMMA (Sumitomo Chemical's Sumipec MG5), a stabilizer (Shin-etu Silicone's KR219, organosiloxane having methoxy and vinyl groups), and an antioxidant (Asahi Denka Industry's PEP36, phosphorus-containing antioxidant) in the ratio indicated in Table 1. The resulting mixture was molded in a mold cavity of 60×60×3 mm, with a regular tetrahedral microprism (height 70 μm) stamper inserted in the cavity. The cylinder temperature was 320° C., and the mold temperature was 115° C. The degree of microprism transfer on the thus-obtained optical waveguide, and the falling weight impact strength and the luminosity of the optical waveguide are given in Table 2. The methods of measuring the data are mentioned below.

(1) Degree of Microprism Transfer:

Ten of the regular tetrahedral microprism structures transferred onto the optical waveguide were selected, and the value of their mean height was divided by 70 μm to obtain the degree (%) of microprism transfer onto the optical waveguide. The height of each regular tetrahedral microprism structure transferred onto the surface of the optical waveguide was measured with an Olympus Optics' scanning laser microscope.

(2) Falling Weight Impact Strength:

Measured according to ASTMD-3763-86. The falling weight speed was 7 m/sec; and the weight was 36.85 N.

(3) Luminosity:

The back (having a microprism structure transferred thereon) and the side of the optical waveguide were covered with a plate (thickness: 3 mm) of high-reflectivity material (this is an injection molding of Idemitsu Petrochemical's Toughlon HR2500), and a ray from a cold cathode tube (Harison Electric's HMBS26E) was applied thereto at the edge adjacent to the light source. The face of the optical waveguide was covered with a milky-white acrylic plate (Mitsubishi Rayon's Acrylight 432, having a thickness of 2 mm), and the center part of the optical waveguide having received the ray in that condition was measured with a luminometer, Minolta's LS-100.

TABLE 1

|  | Polycarbonate Resin | | PMMA | Stabilizer | Antioxidant | Amount of Polymethylene- |
|---|---|---|---|---|---|---|
|  | Type | Amount (wt. pts.) | amount (wt. pts.) | amount (wt. pts.) | amount (wt. pts.) | dicarboxylic Acid(*1) mol % |
| Example 1 | A | 100 | 0 | 0 | 0.03 | 8.1 |
| Example 2 | A | 100 | 0 | 0.1 | 0.03 | 8.1 |
| Example 3 | A | 100 | 0.1 | 0.1 | 0.03 | 8.1 |
| Example 4 | A/B | 75/25 | 0.1 | 0.1 | 0.03 | 6.1 |
| Example 5 | A1 | 100 | 0 | 0 | 0.03 | — |
| Example 6 | A1 | 100 | 0 | 0.1 | 0.03 | — |
| Example 7 | A1 | 100 | 0.1 | 0.1 | 0.03 | — |
| Example 8 | A3 | 100 | 0 | 0 | 0.03 | — |
| Example 9 | A3 | 100 | 0 | 0.1 | 0.03 | — |

TABLE 1-continued

|  | Polycarbonate Resin |  | PMMA | Stabilizer | Antioxidant | Amount of Polymethylene- |
|---|---|---|---|---|---|---|
|  | Type | Amount (wt. pts.) | amount (wt. pts.) | amount (wt. pts.) | amount (wt. pts.) | dicarboxylic Acid(*1) mol % |
| Example 10 | A3 | 100 | 0.1 | 0.1 | 0.03 | — |
| Example 11 | A7 | 100 | 0 | 0.1 | 0.03 | — |
| Example 12 | A8 | 100 | 0.1 | 0.1 | 0.03 | — |
| Comp. Ex. 1 | B | 100 | 0 | 0 | 0.03 | — |
| Comp. Ex. 2 | B | 100 | 0 | 0.1 | 0.03 | — |
| Comp. Ex. 3 | B | 100 | 0.1 | 0.1 | 0.03 | — |
| Comp. Ex. 4 | A2 | 100 | 0 | 0 | 0.03 | — |
| Comp. Ex. 5 | A2 | 100 | 0 | 0.1 | 0.03 | — |
| Comp. Ex. 6 | A2 | 100 | 0.1 | 0.1 | 0.03 | — |
| Comp. Ex. 7 | A4 | 100 | 0 | 0 | 0.03 | — |
| Comp. Ex. 8 | A5 | 100 | 0 | 0.1 | 0.03 | — |
| Comp. Ex. 9 | A4 | 100 | 0.1 | 0.1 | 0.03 | — |
| Comp. Ex. 10 | A6 | 100 | 0 | 0.1 | 0.03 | — |

(*1) Ratio of the polymethylene-dicarboxylic acid to bisphenol A in the polycarbonate resin composition.

TABLE 2

|  | Degree of Microprism Transfer (%) | Falling Weight Impact Strength (J) | Luminosity (Cd/m$^2$) |
|---|---|---|---|
| Example 1 | 99 | 43 | 260 |
| Example 2 | 99 | 42 | 261 |
| Example 3 | 99 | 40 | 320 |
| Example 4 | 98 | 41 | 315 |
| Example 5 | 98 | 43 | 250 |
| Example 6 | 98 | 42 | 257 |
| Example 7 | 98 | 40 | 310 |
| Example 8 | 99 | 41 | 250 |
| Example 9 | 99 | 40 | 256 |
| Example 10 | 99 | 41 | 308 |
| Example 11 | 99 | 40 | 256 |
| Example 12 | 99 | 41 | 308 |
| Comparative Example 1 | 90 | 40 | 215 |
| Comparative Example 2 | 90 | 39 | 218 |
| Comparative Example 3 | 90 | 39 | 290 |
| Comparative Example 4 | 90 | 40 | 215 |
| Comparative Example 5 | 90 | 39 | 218 |
| Comparative Example 6 | 90 | 39 | 290 |
| Comparative Example 7 | 99 | 11 | 244 |
| Comparative Example 8 | 99 | 12 | 248 |
| Comparative Example 9 | 99 | 10 | 305 |
| Comparative Example 10 | 90 | 39 | 220 |

INDUSTRIAL APPLICABILITY

In the invention, used is a polycarbonate resin composition having high mechanical strength and having improved flowability, for the material of optical waveguide. Therefore, the optical waveguide made of the resin composition enjoys good transfer of a microprism structure onto its face or back, and has high mechanical strength and good photoconductivity.

What is claimed is:

1. An optical waveguide which comprises (A) a copolyester carbonate having aliphatic segment(s), the optical waveguide being made of a tabular molding and having a light-scattering layer formed directly on the face or back.

2. The optical waveguide as claimed in claim 1, wherein the aliphatic segment in the component (A) is derived from a polymethylene-dicarboxylic acid, and the ratio of the polymethylene-dicarboxylic acid falls between 1 and 30 mol % of the main monomer (diphenol) that constitutes the polycarbonate resin composition.

3. The optical waveguide as claimed in claim 1, wherein the light-scattering layer has a microprism structure.

4. A method for producing the optical waveguide of claim 3, in which, when a tabular molding for it is injection-molded, a microprism structure that serves as a light-scattering layer is transferred onto its face or back with a stamper.

5. The optical waveguide as claimed in claim 3, wherein the microprism structure is a regular tetrahedral structure.

6. A method for producing the optical waveguide of claim 5, in which, when a tabular molding for it is injection-molded, a microprism structure that serves as a light-scattering layer is transferred onto its face or back with a stamper.

7. The optical waveguide as claimed in claim 5, wherein the regular tetrahedral structure has a height falling between 10 and 300 μm.

8. A method for producing the optical waveguide of claim 7, in which, when a tabular molding for it is injection-molded, a microprism structure that serves as a light-scattering layer is transferred onto its face or back with a stamper.

9. A device, comprising:
the optical waveguide of claim 1 and a light source.

10. A method of scattering light, which comprises:
illuminating a surface of the optical waveguide of claim 1 with a light and directing the light through the light-scattering layer.

11. An optical waveguide made from a polycarbonate resin composition that comprises (A) a copolyester carbonate having aliphatic segment(s), and at least one resin selected from (B) an aromatic polycarbonate and (C) an acrylic resin, in which the amount of (B) is at most up to 90 parts by weight relative to 100 parts by weight of (A), and the amount of (C) falls between 0.01 and 1.0 part by weight relative to 100 parts by weight of (A), the optical waveguide being made of a tabular molding and having a light-scattering layer formed directly on the face or back.

12. The optical waveguide as claimed in claim 11, wherein the aliphatic segment in the component (A) is derived from a polymethylene-dicarboxylic acid, and the ratio of the polymethylene-dicarboxylic acid falls between 1 and 30 mol % of the main monomer (diphenol) that constitutes the polycarbonate resin composition.

13. The optical waveguide as claimed in claim 11, wherein the light-scattering layer has a microprism structure.

14. The optical waveguide as claimed in claim 13, wherein the microprism structure is a regular tetrahedral structure.

15. The optical waveguide as claimed in claim 14, wherein the regular tetrahedral structure has a height falling between 10 and 300 μm.

16. A device, comprising:
the optical waveguide of claim 11 and a light source.

17. A method of scattering light, which comprises:
illuminating a surface of the optical waveguide of claim 11 with a light source and directing the light through the light-scattering layer.

18. An optical waveguide which comprises an aromatic polycarbonate resin terminated with a substituted phenoxy group of a general formula:

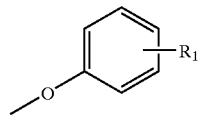

in which $R^1$ represents an alkyl group having from 10 to 30 carbon atoms, or a branched alkyl group having from 10 to 30 carbon atoms, or a formula:

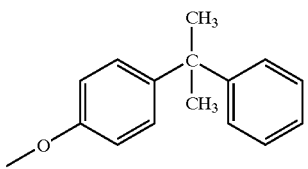

or a formula

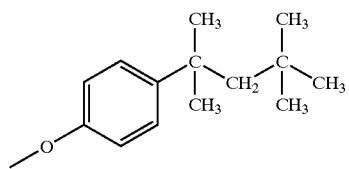

and, the optical waveguide being made of a tabular molding and having a light-scattering layer formed directly on the face or back.

19. The optical waveguide as claimed in claim 18, which comprises from 0.01 to 1.0 part by weight of an acrylic resin relative to 100 parts by weight of the aromatic polycarbonate resin therein.

20. The optical waveguide as claimed in claim 18, wherein the light-scattering layer has a microprism structure.

21. The optical waveguide as claimed in claim 20, wherein the microprism structure is a regular tetrahedral structure.

22. The optical waveguide as claimed in claim 21, wherein the regular tetrahedral structure has a height falling between 10 and 300 μm.

* * * * *